(12) United States Patent
Huang (10) Patent No.: US 7,376,265 B2
(45) Date of Patent: May 20, 2008

(54) SEGMENTATION-BASED HYBRID COMPRESSION SCHEME FOR SCANNED DOCUMENTS

(75) Inventor: Jincheng Huang, Sunnyvale, CA (US)

(73) Assignee: Seiko Epson Corporation, Tokyo (JP)

( * ) Notice: Subject to any disclaimer, the term of this patent is extended or adjusted under 35 U.S.C. 154(b) by 705 days.

(21) Appl. No.: 10/870,790

(22) Filed: Jun. 17, 2004

(65) Prior Publication Data

US 2005/0281474 A1    Dec. 22, 2005

(51) Int. Cl.
*G06K 9/00* (2006.01)
*G06K 9/48* (2006.01)
*G06K 9/36* (2006.01)

(52) U.S. Cl. ............... 382/166; 382/199
(58) Field of Classification Search ............ 382/162, 382/166, 172, 173, 199, 232, 233, 239, 250; 375/240.01, 240.02, 240.03, 240.2, 240.22
See application file for complete search history.

(56) References Cited

U.S. PATENT DOCUMENTS

| 5,644,406 A * | 7/1997 | Harrington et al. ......... 382/239 |
| 6,320,982 B1 | 11/2001 | Kurzweil et al. |
| 6,625,319 B1 | 9/2003 | Krishnamachari |
| 6,625,323 B2 | 9/2003 | Henderson et al. |
| 2002/0191858 A1 | 12/2002 | Sindu |
| 2003/0021471 A1* | 1/2003 | Said ............... 382/166 |
| 2003/0133612 A1* | 7/2003 | Fan ............... 382/199 |
| 2005/0281474 A1* | 12/2005 | Huang ............... 382/239 |

FOREIGN PATENT DOCUMENTS

WO    WO 01/29771    4/2001

OTHER PUBLICATIONS

L. Bottou, et al., "High Quality Document Image Compression with DjVu", *Journal of Electronic Imaging*, vol. 7, No. 3, pp. 410-425, Jul. 1998.
J. Huang, et al., "Check Image Compression Using a Layered Coding Method", *Journal of Electronic Imaging*, vol. 7, No. 3, pp. 426-442, Jul. 1998.

* cited by examiner

*Primary Examiner*—Amir Alavi (57) ABSTRACT

A hybrid compression scheme in which one or more compression schemes are applied to a scanned document depending on its content. Based on the scanned document data itself and edge-map version thereof, a color test is performed to determine if the document is text or a drawing. If only a few colors are detected, the entire document is compressed by a photo compression technique at full resolution. If more than a few colors are present, the document is most likely a mixed mode document, in which case the entire document undergoes segmentation, a process in which text and drawing regions are separated from the background. The mask of the text and/or drawing regions are coded by a bi-level compression technique, whereas background is down-sampled, if necessary, and then compressed by a photo compression technique. A wrapper module is used to wrap the compressed stream(s) into a single file for easy browsing or transmitting.

16 Claims, 6 Drawing Sheets

SEGMENTATION-BASED HYBRID COMPRESSION SCHEME FOR SCANNED DOCUMENTS

BACKGROUND OF THE INVENTION

1. Field of the Invention

This invention relates to compression of digital data, and more particularly to a compression scheme that applies different compression techniques to different content (text, photo, graphics, etc.) in a digital representation.

2. Description of the Related Art

Uncompressed digital documents can be quite large in size. An image-containing letter-size page scanned at 300 dots per inch (dpi) requires 25,245 KB (2550 pixels×3300 pixels×3 bytes/pixel) of storage. To store or transmit such data in the uncompressed state is simply too costly in terms of time and memory requirements. Thus, applications and devices which store or transmit high quality digitized color images typically do so in a compressed format, using one of the currently available compression techniques. Depending on the capacity of the storage medium or the bandwidth constraints of the transmission system, the compression ratio may need to be quite high. An acceptable size for sending a scanned page via email would be around 200 KB. That requires a compression ratio of approximately 100.

Given such a compression ratio constraint, the task is to meet that constraint while still maintaining a certain level of image quality. This can be difficult, since compression ratio and image quality are inversely related. Mixed mode documents (e.g., documents having different types of content: photo, text, graphics, etc.) provide an additional challenge. A particular compression technique may work well on one type of content, e.g., a photo, but not so well on another type, e.g., text. Even different settings of the same technique may provide good results on some content and poor results on other content.

Figure 1:
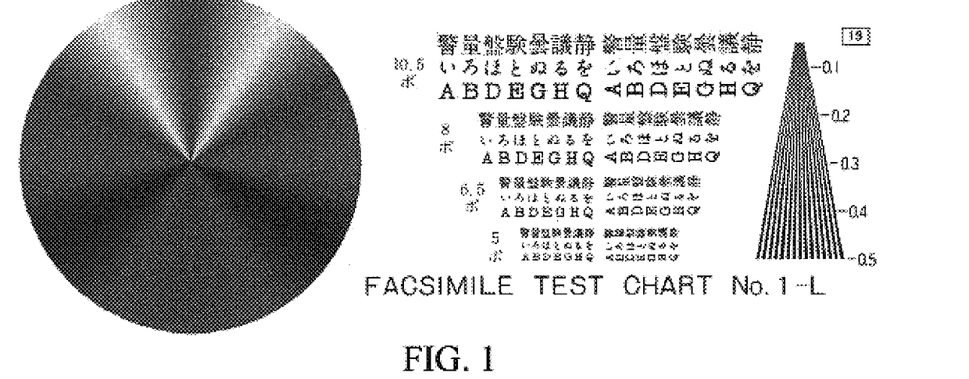
FIG. 1 illustrates an original image at 300 dpi.
Figure 2:
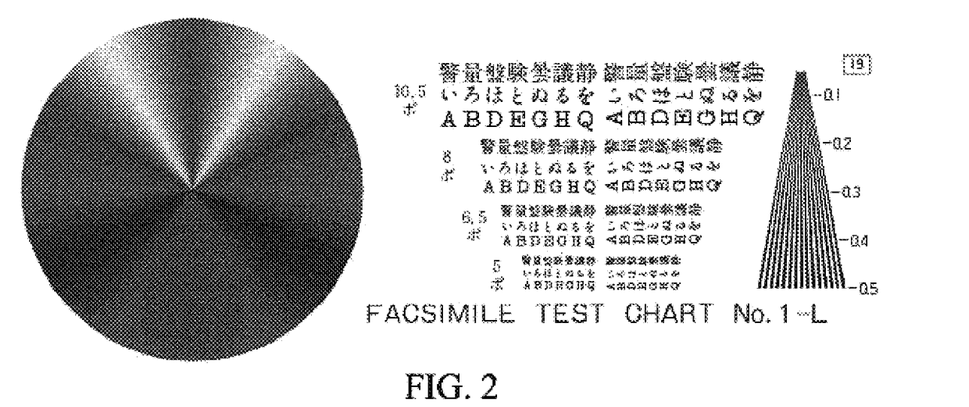
FIG. 2 illustrates a 300 dpi compressed version of the image shown in FIG. 1.
Figure 3:
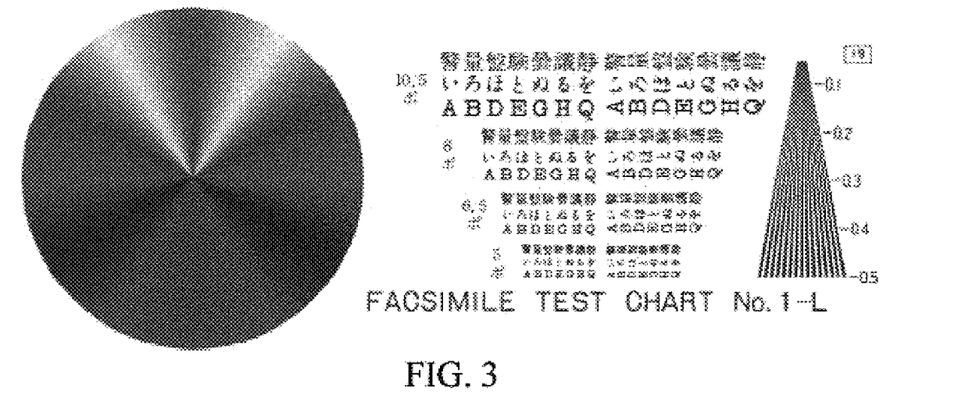
FIG. 3 illustrates a down-sampled (to 150 dpi) and then compressed version of the image shown in FIG. 1.

FIGS. 1-3 illustrate the problems. FIG. 1 shows an image scanned at 300 dpi with a file size of about 3,612 KB. FIG. 2 shows the same image at 300 dpi but compressed by JPEG. The image shown in FIG. 3 is again the same image but down-sampled to 150 dpi and compressed by Joint Photographic Experts Group (JPEG). The images in FIGS. 2 and 3 have similar file sizes, i.e., about 34.95 KB and 34.77 KB respectively, but provide different results on different content. The color spectrum in the image of FIG. 2 is very blocky, but the text on the right is quite sharp. The image of FIG. 3, on the other hand, exhibits a smooth color spectrum, but the quality of its text suffers.

What is needed is an effective compression algorithm that, when applied to mixed mode documents, achieves high compression ratios while maintaining smooth image quality and sharp text and drawings.

OBJECTS OF THE INVENTION

It is an object of this invention to overcome the problems of the prior art.

It is another object of this invention to provide a segmentation-based hybrid compression scheme for digital data, particularly mixed mode data, that achieves relatively high compression ratios while still maintaining high document quality.

SUMMARY OF THE INVENTION

In one aspect, the invention involves a method for compressing digital data. The method comprises the steps of: generating an edge-map representation from an input representation; and applying a color test to the input representation based on it and the edge-map representation to determine the type of content contained in the input representation. If the input representation contains only text, only line drawing, or only text and line drawing, applying a first photo compression algorithm (e.g., JPEG) to the input representation to compress it. However, if the input representation contains at least one of a photo or image and at least one of text or line drawing, (i) applying a segmentation operation to the input representation based on it and the edge-map representation to separate a background portion from a foreground portion of the input representation, the foreground portion containing at least one of a text or a line drawing region, (ii) applying a bi-level compression algorithm to a mask of each text and line drawing region in the foreground portion, and (iii) applying a second photo compression algorithm (e.g., JPEG) to the background portion.

The input representation may be an entire document or a single page of a multi-page document.

Preferably, the background portion is down-sampled before applying the second photo compression algorithm which is then applied to the down-sampled background portion.

Preferably, the step of applying a color test to the input representation comprises: generating a color histogram of the input representation and a color histogram of the edge-map representation; and comparing the color histograms to determine the type of content contained in the input representation.

In the step of applying a segmentation operation to the input representation, preferably each text or line drawing region in the foreground region constitutes a high frequency region that is separated from the background portion.

The step of applying a segmentation operation to the input representation to separate each high frequency region from the background portion preferably comprises, for each edge pixel, examining each of a plurality of pixel regions defined by respective search windows to determine if any of the pixel regions contain more than a threshold number of edge pixels, and removing the subject edge pixel if none of the pixel regions contain more than the threshold number of edge pixels.

According to another aspect of the invention, an apparatus is provided for compressing digital data. The apparatus comprises: an edge detector configured to generate an edge-map representation from an input representation; color test module configured to apply a color test to the input representation based on it and the edge-map representation to determine the type of content contained in the input representation; a first photo compression module configured to apply a first photo compression algorithm to the input representation to compress it, if the input representation contains only text, only line drawing, or only text and line drawing; a segmentation module configured to apply a segmentation operation to the input representation to separate a background portion from a foreground portion of the input representation, the foreground portion containing at least one of a text or a line drawing region, if the input representation contains at least one of a photo or image and at least one of text or line drawing; a bi-level compression module configured to apply a bi-level compression algorithm to a mask of each text and line drawing region in the foreground portion; and a second photo compression module configured to apply a second photo compression algorithm to the background portion.

The apparatus preferably further includes a down-sample module configured to down-sample the background portion, wherein the second photo compression algorithm is applied to the down-sampled background portion.

In accordance with further aspects of the invention, the above-described method or any of the steps thereof may be embodied in a program of instructions in the form of software which may be stored on, or conveyed to, a computer or other processor-controlled device for execution. Alternatively, the program of instructions may be embodied directly in hardware (e.g., ASIC, digital signal processing circuitry, etc.). A combination of software and hardware may also be used to implement the program of instructions.

Other objects and attainments together with a fuller understanding of the invention will become apparent and appreciated by referring to the following description and claims taken in conjunction with the accompanying drawings.

DESCRIPTION OF THE PREFERRED EMBODIMENTS

Figure 4:
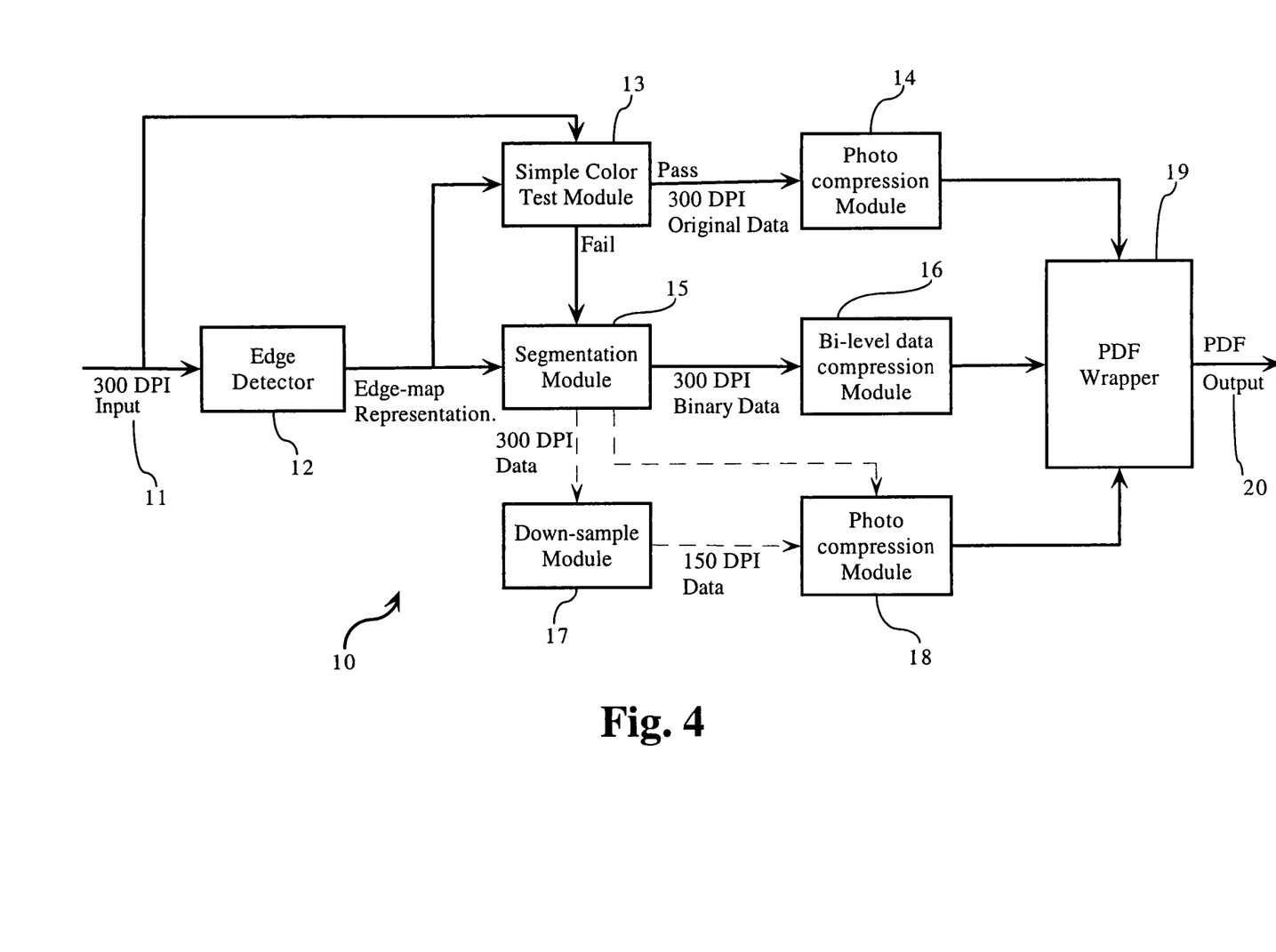
FIG. 4 illustrates a block diagram of a system for performing a segmentation-based hybrid compression scheme in accordance with embodiments of the invention.

FIG. 4 is a block diagram illustrating a system 10 designed to perform a segmentation-based hybrid compression scheme according to embodiments of the invention. A digital representation 11, which in the illustrated embodiment is a 300 dpi, 24-bit depth RGB representation, is input to an edge detector 12. Input representation 11 is typically a scanned version of a document that may or may not have been previously generated on a computer. Alternatively, input representation 11 may be a computer-generated document that is directly retrieved by system 10. It should be noted that input representation 11 may be at a different resolution as well. 300 dpi is exemplary only.

Edge-based segmentation is an important feature of the algorithm of the present invention. To that end, edge detector 12 converts the 300 dpi, 24-bit depth RGB input representation 11 to (or generates therefrom) a grayscale representation. Edge detector 12 also performs Sobel filtering on the grayscale representation, and then thresholds the result to generate an edge-map representation, which is a bi-level representation in which edge pixels are identified. The setting of the threshold level depends on various factors including the content of the input representation 11 and is well within the understanding of those skilled in the art.

The edge-map representation as well as input representation 11 are input to a color test module 13 which uses these inputs to examine the color make-up of input representation 11. If only a few colors are detected, e.g., about 10 or less, input representation 11 is most likely text or a drawing. In that case, input representation 11 is compressed using a photo compression technique, e.g., JPEG, in module 14 at full resolution (e.g., 300 dpi). If the color test fails, that is, more than a few colors are detected, input representation 11 is likely a mixed-mode document, meaning that the it contains a photo and/or a photo-like image as well as text and/or line drawing. In this case, input representation 11 is passed to a segmentation module 15, which also receives the edge-map output from edge detector 12. Segmentation module 15 segments input representation 11. During this segmentation operation, all regions that contain text and/or graphics and thus require high spatial resolution are separated from the background.

The mask of each high spatial resolution region, i.e., the mask of each text and drawing region, is transmitted to module 16 in which the data is coded by a bi-level image compression technique, e.g., International Telegraph and Telephone Consultative Committee (CCITT) Group 3/4 Fax Standard or equivalent. Each high spatial resolution region is represented by a single color which can be the mean color of that region.

In one embodiment, the background is input to a down-sample module 17 where it is down-sampled by a suitable factor, e.g., by two to 150 dpi. The down-sampled background is then compressed using a photo compression technique, e.g., JPEG, in module 18. If down-sampling is not necessary, i.e., the original data is already at relatively low resolution, the background from segmentation module 15 can be transmitted directly to photo compression module 18. To improve the coding efficiency, each of the pixels in the region(s) in which text or drawing pixels were previously present before segmentation, i.e., the high spatial resolution region(s), is filled with the mean value of a select number of its neighbor pixels in the background.

The hybrid compression process of this invention may be applied to a single- or multi-page document. In the latter case, the process may be applied as a whole or on a page-by-page basis. Depending on the document and its content a compressed bit stream will result from each of the Photo compression modules 14 and 18 and the bi-level compression data module 16, just modules 16 and 18, or just module 14. In cases in which multiple compressed bit streams are produced, a portable document format (PDF) wrapper 19 or like module that supports various compression techniques such as JPEG, CCITT Group 3/4 Fax, Joint Bi-level Image Experts Group (JBIG), etc. is employed to wrap the compressed bit streams into a single file for convenient viewing, storage or transmission.

Having described the overall processing, some additional detail is presented below regarding the functions of the color test module 13 and the segmentation module 15.

Usually a document that only contains text or graphics (line drawings) has only a few distinct colors, and the colors at the edge are the same as the colors elsewhere. Thus, color test module 13 is used to determine if the input representation 11 has only a few colors. If so, input representation 11 likely only contains text or line drawings. Hence, aggressive photo, e.g., JPEG, compression can be used while maintaining high spatial resolution (300 dpi).

In performing the color test, in a preferred embodiment, module 13 generates color histograms of the original image (input representation 11) and of the edge regions in the edge-map output from edge detector 12. To generate color histograms, the original 24-bit depth color representation is quantized into fewer color bins. One quantization approach that can be used is to quantize uniformly into 8-bit color (3 bits for red, 3 bits for green and 2 bits for blue). Thus, using that approach on a 24-bit color representation, for each pixel, the 5 least significant bits of each of its red and green color components and the 6 least significant bits of its blue color component are truncated. Each pixel is then assigned to one of 256 color bins, with the color of each pixel, and hence the particular color bin to which it is assigned, being determined based on the 3 most significant red color bits, the 3 most significant green color bits and the 2 most significant blue color bits. This is an example of one quantization approach; other suitable quantization approaches can be used instead.

Figure 5:
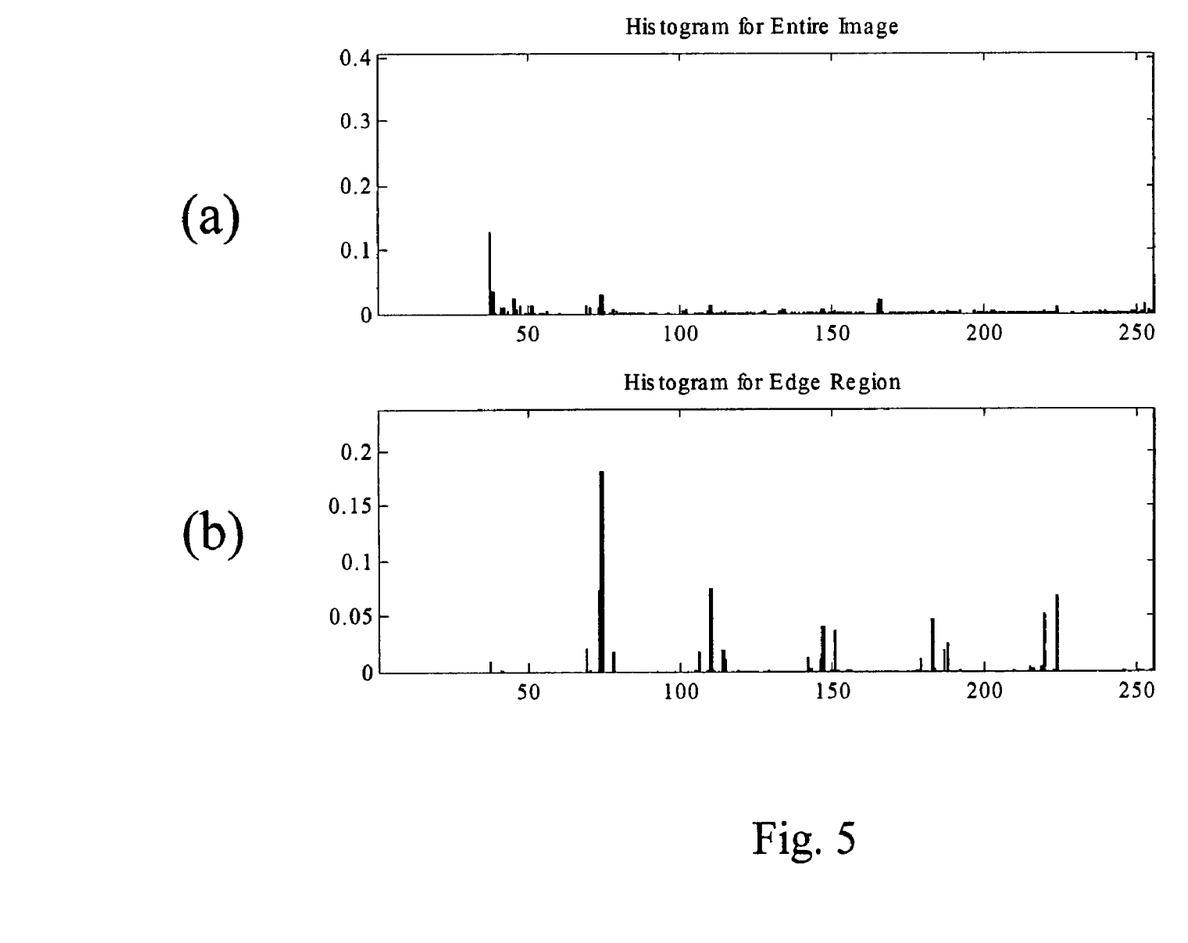
FIG. 5 shows color histograms of (a) an entire representation containing drawing/line art and (b) only the edge regions of that representation.

If the dominant colors in the entire input representation 11 are also the dominate colors in the edge regions (shown by the edge-map representation), this means that input representation 11 has a limited number of colors, e.g., about 10 or less, and hence likely contains only text and/or drawing. Such a situation is illustrated in FIGS. 5(a) and (b). FIG. 5(a) shows a color histogram for an entire representation containing drawing/line art but no photos or photo-like images, while FIG. 5(b) shows a color histogram for only the edge regions of that representation. As can be seen, the histograms look substantially alike.

Figure 6:
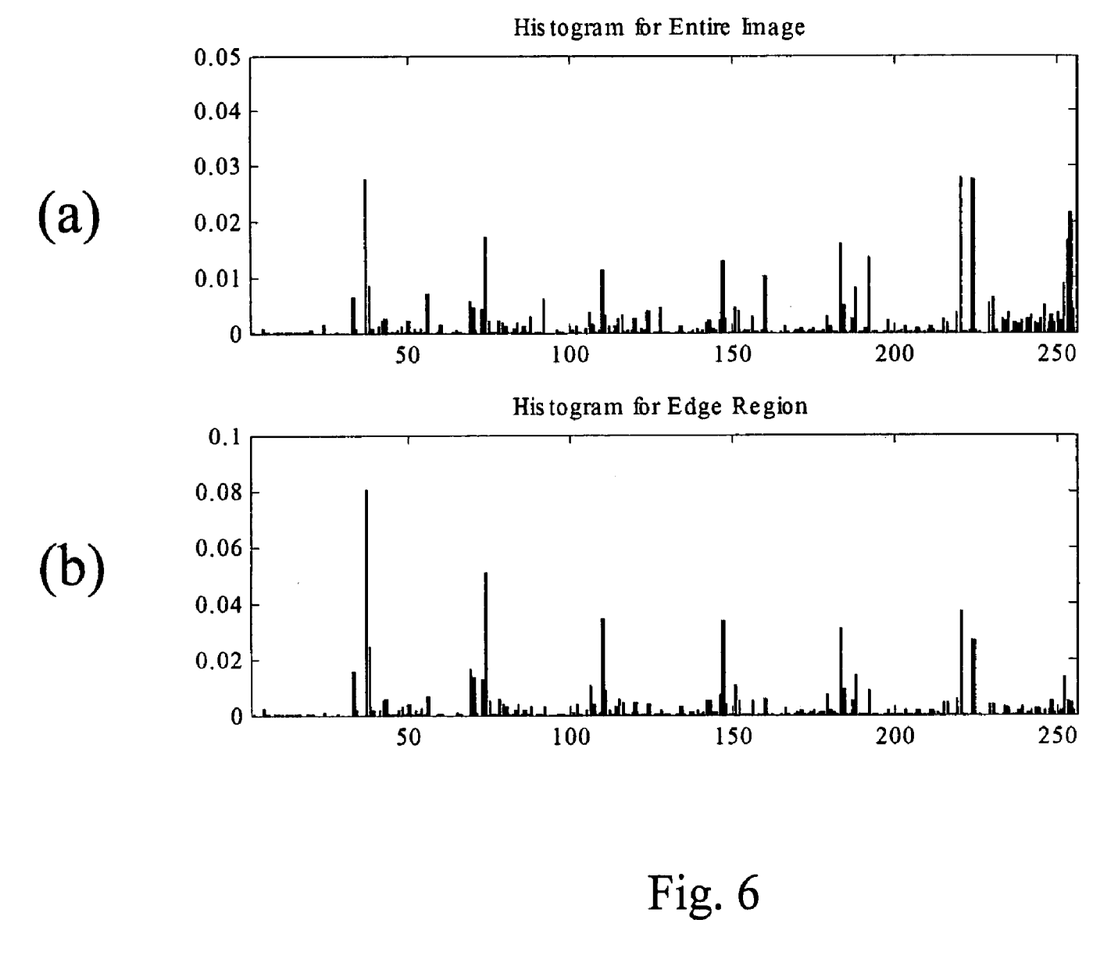
FIG. 6 shows color histograms of (a) an entire representation containing photo and text and (b) only the edge regions of that representation.

On the other hand, input representation 11 is likely a mixed-mode document, if dominant colors in the entire input representation 11 are not also the dominate colors in the edge regions. This situation is illustrated in FIGS. 6(a) and (b). FIG. 6(a) shows a color histogram for an entire representation containing photo and text, i.e., a mixed mode representation, while FIG. 6(b) shows a color histogram for only the edge regions of that representation. Note that the two histograms look different.

With respect to the segmentation operation (performed by segmentation module 15), in a preferred embodiment a two-pass, high frequency region detection process is performed on the input representation received from color test module 13 based on the edge-map representation obtained from edge detector 12.

Figure 7:
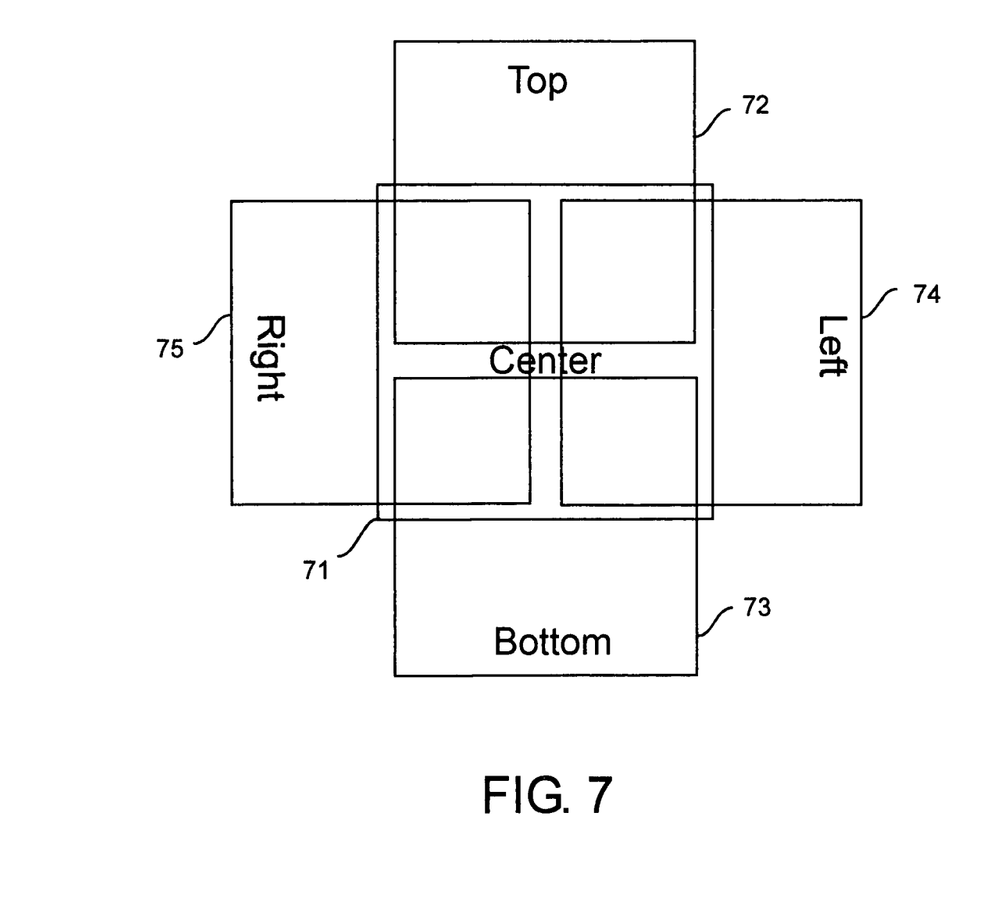
FIG. 7 is a schematic illustration of neighboring search windows for determining neighboring edge pixels in the segmentation-based hybrid compression scheme.

After edge detection, a morphological operation, such as closing (dilation followed by erosion), is performed on the edges to fill in the narrow gaps between edges. Then, some edge pixels are eliminated by counting neighboring edge pixels. Referring to FIG. 7, for every edge pixel, the number of neighboring edge pixels are determined by examining each of five search windows: a center window 71 that is centered on the subject pixel and also contains surrounding pixels, a top window 72 that includes a region of pixels above the subject pixel, a bottom window 73 that includes a region of pixels below the subject pixel, a left window 74 that includes a region of pixels to the left of the subject pixel, and a right window 75 that includes a region of pixels to the right of the subject pixel. Note that some windows overlap others. If none of the neighboring regions contain more than a threshold number of edge pixels, the subject edge pixel is eliminated. This process removes small isolated edges.

In the second pass, the colors at the edge regions are verified. In so doing, segmentation module 15 determines the background color and foreground color of input representation 11. The background color is the most dominant color in the entire representation and is also one of the dominant colors in the edge region(s). The foreground color, which is also one of the dominant colors in the edge region(s), exhibits high contrast with the background color. That is, the difference between the foreground color and the background color is greater than a specified threshold. Knowing the background and foreground colors, each pixel in an edge region is identified as a high frequency pixel, if the difference between its color and the determined foreground color is less than a specified threshold. High frequency pixels are then removed. The resulting representation is sent to down-sample module 17, if necessary, or directly to photo compression module 18. The mask of each region in which high frequency pixels were removed is sent to bi-level compression module 16.

Figure 8:
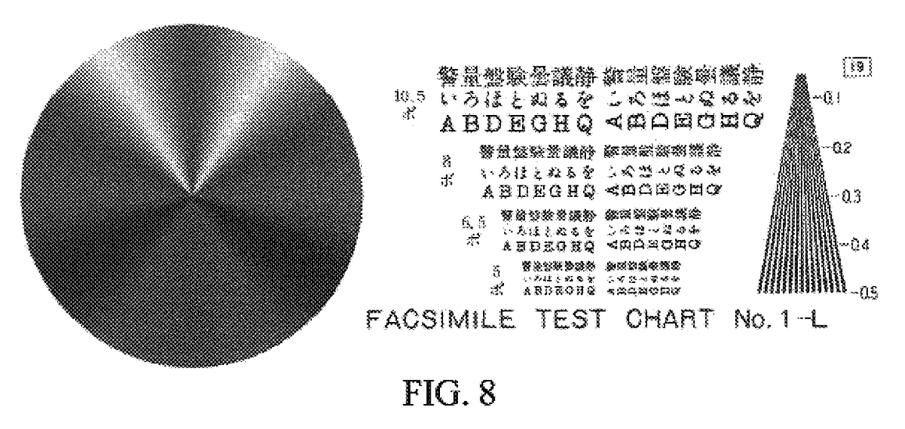
FIG. 8 illustrates a result obtained by the segmentation-based hybrid compression scheme.

FIG. 8 shows a result obtained by the segmentation-based hybrid compression scheme of the present invention. The file size of the image is approximately 36.8 KB (including meta descriptions in PDF), which is similar to the sizes of the images in FIGS. 2 and 3. However, in the image of FIG. 8, the smoothness in the photo region and the sharpness in the text region are preserved, thereby yielding a better overall result.

As will be appreciated from the foregoing, the segmentation-based hybrid compression scheme, in accordance with the present invention, may be implemented in a variety of different ways. Software, hardware, or software/hardware combinations are possible. A hardware implementation may be realized, for example, using ASIC(s), digital signal processing circuitry, or the like. As such, the claim language "computer-readable medium" includes not only software-carrying media, but also hardware having instructions for performing the required processing hardwired thereon, as well as a combination of hardware and software. Similarly, the claim language "program of instructions" includes both software and instructions embedded on hardware. Also, each of the modules referred to in the claims covers any appropriately configured device that is capable of performing the functions recited. Such devices may include, for example, an instruction-driven processor (e.g., a CPU), ASIC, digital signal processing circuitry, or combination thereof With these implementation alternatives in mind, it is to be understood that the figures and accompanying description provide the functional information one skilled in the art would require to write program code (i.e., software) or to fabricate circuits (i.e., hardware) to perform the processing required.

While the invention has been described in conjunction with several specific embodiments, it is evident to those skilled in the art that many further alternatives, modifications and variations will be apparent in light of the foregoing description. Thus, the invention described herein is intended to embrace all such alternatives, modifications, applications and variations as may fall within the spirit and scope of the appended claims.

What is claimed is:

1. A method for compressing digital data, comprising the steps of:
    generating an edge-map representation from an input representation; and
    applying a color test to the input representation based on it and the edge-map representation to determine the type of content contained in the input representation, then
        if the input representation contains only text, only line drawing, or only text and line drawing, applying a first photo compression algorithm to the input representation to compress it, or
        if the input representation contains at least one of a photo or image and at least one of text or line drawing, (i) applying a segmentation operation to the input representation based on it and the edge-map representation to separate a background portion from a foreground portion of the input representation, the foreground portion containing at least one of a text or a line drawing region, (ii) applying a bi-level compression algorithm to a mask of each text and line drawing region in the foreground portion, and (iii) applying a second photo compression algorithm to the background portion.

2. A method as recited in claim 1, wherein (iii) comprises down-sampling the background portion and then applying the second photo compression algorithm to the down-sampled background portion.

3. A method as recited in claim 1, wherein the step of applying a color test to the input representation comprises:
   generating a color histogram of the input representation and a color histogram of the edge-map representation; and
   comparing the color histograms to determine the type of content contained in the input representation.

4. A method as recited in claim 1, wherein, in the step of applying a segmentation operation to the input representation, each text or line drawing region in the foreground region constitutes a high frequency region that is separated from the background portion.

5. A method as recited in claim 4, wherein the step of applying a segmentation operation to the input representation to separate each high frequency region from the background portion comprises, for each edge pixel,
   examining each of a plurality of pixel regions defined by respective search windows to determine if any of the pixel regions contain more than a threshold number of edge pixels, and
   removing the subject edge pixel if none of the pixel regions contain more than the threshold number of edge pixels.

6. A method as recited in claim 1, wherein each of the first and second photo compression algorithm is JPEG compression.

7. A method as recited in claim 1, wherein the input representation comprises an entire document or a single page of a multi-page document.

8. An apparatus for compressing digital data, comprising:
   an edge detector configured to generate an edge-map representation from an input representation;
   color test module configured to apply a color test to the input representation based on it and the edge-map representation to determine the type of content contained in the input representation;
   a first photo compression module configured to apply a first photo compression algorithm to the input representation to compress it, if the input representation contains only text, only line drawing, or only text and line drawing;
   a segmentation module configured to apply a segmentation operation to the input representation to separate a background portion from a foreground portion of the input representation, the foreground portion containing at least one of a text or a line drawing region, if the input representation contains at least one of a photo or image and at least one of text or line drawing;
   a bi-level compression module configured to apply a bi-level compression algorithm to a mask of each text and line drawing region in the foreground portion; and
   a second photo compression module configured to apply a second photo compression algorithm to the background portion.

9. An apparatus as recited in claim 8, further comprising a down-sample module configured to down-sample the background portion, wherein the second photo compression algorithm is applied to the down-sampled background portion.

10. A computer-readable medium embodying a program of instructions configured to direct a device to compress digital data, the program of instructions comprising:
    instructions for generating an edge-map representation from an input representation;
    instructions for applying a color test to the input representation based on it and the edge-map representation to determine the type of content contained in the input representation;
    instructions for applying a first photo compression algorithm to the input representation to compress it, which are executed if the input representation contains only text, only line drawing, or only text and line drawing; and
    instructions for (i) applying a segmentation operation to the input representation based on it and the edge-map representation to separate a background portion from a foreground portion of the input representation, the foreground portion containing at least one of a text or a line drawing region, (ii) applying a bi-level compression algorithm to a mask of each text and line drawing region in the foreground portion, and (iii) applying a second photo compression algorithm to the background portion, which are executed if the input representation contains at least one of a photo or image and at least one of text or line drawing.

11. A computer-readable medium as recited in claim 10, wherein instructions (iii) comprises instructions for down-sampling the background portion and the instructions for applying the second photo compression algorithm comprises instructions for applying the second photo compression algorithm to the down-sampled background portion.

12. A computer-readable medium as recited in claim 10, wherein the instructions for applying a color test to the input representation comprises:
    instructions for generating a color histogram of the input representation and a color histogram of the edge-map representation; and
    instructions for comparing the color histograms to determine the type of content contained in the input representation.

13. A computer-readable medium as recited in claim 10, wherein, in the execution of the instructions for applying a segmentation operation to the input representation, each text or line drawing region in the foreground region constitutes a high frequency region that is separated from the background portion.

14. A computer-readable medium as recited in claim 13, wherein the instructions for applying a segmentation operation to the input representation to separate each high frequency region from the background portion comprises, for each edge pixel,
    instructions for examining each of a plurality of pixel regions defined by respective search windows to determine if any of the pixel regions contain more than a threshold number of edge pixels, and
    instructions for removing the subject edge pixel if none of the pixel regions contain more than the threshold number of edge pixels.

15. A computer-readable medium as recited in claim 10, wherein each of the first and second photo compression algorithm is JPEG compression.

16. A computer-readable as recited in claim 10, wherein the input representation comprises an entire document or a single page of a multi-page document.

* * * * *